(12) United States Patent
Grob

(10) Patent No.: US 9,623,528 B2
(45) Date of Patent: Apr. 18, 2017

(54) TOOL TONGS

(71) Applicant: GROB-WERKE GmbH & Co. KG, Mindelheim (DE)

(72) Inventor: h. c. Burkhart Grob, Bad Wörishofen (DE)

(*) Notice: Subject to any disclaimer, the term of this patent is extended or adjusted under 35 U.S.C. 154(b) by 0 days.

(21) Appl. No.: 14/972,238

(22) Filed: Dec. 17, 2015

(65) Prior Publication Data
US 2016/0101493 A1    Apr. 14, 2016

Related U.S. Application Data

(62) Division of application No. 13/837,264, filed on Mar. 15, 2013.

(30) Foreign Application Priority Data

Mar. 16, 2012 (DE) .................. 10 2012 102 263
May 31, 2012 (DE) .................. 10 2012 104 733

(51) Int. Cl.
*B23Q 3/157* (2006.01)
*B25J 15/12* (2006.01)
(Continued)

(52) U.S. Cl.
CPC ..... *B23Q 3/15553* (2013.01); *B23Q 3/15526* (2013.01); *B23Q 7/043* (2013.01);
(Continued)

(58) Field of Classification Search
CPC ......... Y10T 483/1809; Y10T 483/1882; Y10S 483/902; B23Q 3/15553; B25J 15/12; B25J 15/08
(Continued)

(56) References Cited

U.S. PATENT DOCUMENTS 2,742,316 A * 4/1956 Phillips .................. B66F 9/183
                                                          294/119.1
3,526,033 A * 9/1970 Saunders ........... B23Q 3/15706
                                                            483/54
(Continued)

FOREIGN PATENT DOCUMENTS

CH        555220       10/1974
CN       2455434 Y    10/2001
(Continued)

OTHER PUBLICATIONS

European Search Report with translation and references cited therein of the European Patent Office for the parallel European Application No. 13 15 87 98.2 dated May 23, 2013.
(Continued)

*Primary Examiner* — Erica E Cadugan
(74) *Attorney, Agent, or Firm* — McCormick, Paulding & Huber LLP

(57) ABSTRACT

The invention relates to tool tongs for the releasable holding of a tool, for example in a machine tool. The invention is characterized in that the tool tongs are formed by a tongs basic element and a tongs clamping element interacting and connected with the tongs basic element, wherein in the tool holding position the tongs basic element and the tongs clamping element hold the tool clampingly at its gripping elements, wherein the tongs basic element and/or the tongs clamping element is/are formed of flat material or plate-like material, such as, for example, steel sheet or the like.

12 Claims, 5 Drawing Sheets

(51) Int. Cl.
  *B23Q 3/155* (2006.01)
  *B23Q 7/04* (2006.01)
  *B25J 11/00* (2006.01)

(52) U.S. Cl.
  CPC .............. *B25J 11/00* (2013.01); *B25J 15/12* (2013.01); *B23Q 3/15706* (2013.01); *B23Q 3/15722* (2016.11); *B23Q 3/15766* (2013.01); *B23Q 2003/15527* (2016.11); *Y10S 483/902* (2013.01); *Y10T 483/17* (2015.01); *Y10T 483/1795* (2015.01); *Y10T 483/1809* (2015.01); *Y10T 483/1882* (2015.01)

(58) Field of Classification Search
  USPC .............................. 483/59, 67, 902; 294/99.1
  See application file for complete search history.

(56) References Cited

U.S. PATENT DOCUMENTS

| | | | | |
|---|---|---|---|---|
| 4,338,709 | A | * | 7/1982 | Straub ................ B23Q 3/15706 211/1.54 |
| 4,761,877 | A | | 8/1988 | Rupp |
| 4,858,980 | A | | 8/1989 | Dreisig et al. |
| 7,341,549 | B2 | | 3/2008 | Jung |
| 2003/0130101 | A1 | | 7/2003 | Hwang |

FOREIGN PATENT DOCUMENTS

| | | | |
|---|---|---|---|
| CN | 2700031 | Y | 5/2005 |
| CN | 1817558 | A | 8/2006 |
| CN | 101415522 | A | 4/2009 |
| CN | 202085907 | U | 12/2011 |
| DE | 3531160 | A1 | 3/1987 |
| DE | 68909148 | T2 | 1/1994 |
| DE | 19609145 | A1 | 9/1997 |
| DE | 102005026172 | A1 | 3/2006 |
| DE | 102008014779 | A1 | 9/2009 |
| DE | 202010003378 | U1 | 8/2011 |
| EP | 0355271 | A2 | 2/1990 |
| EP | 847833 | A1 * | 6/1998 |
| EP | 1690632 | A1 | 8/2006 |
| GB | 2025805 | A * | 1/1980 |
| JP | 58-155141 | A * | 9/1983 |
| JP | 01-289633 | A * | 11/1989 |

OTHER PUBLICATIONS

An Office Action issued in corresponding German Appln. No. DE 10 2012 104 733.2 dated Dec. 7, 2012 with translation.
Chinese Office Action dated Apr. 6, 2016 corresponding to CN201310206430.4.
Chinese Office Action dated Dec. 2, 2016 corresponding to Chinese Patent application 201310206430.4.
European Office Action dated May 13, 2014 corresponding to European Patent application 13 158 798.2-1702.

* cited by examiner

TOOL TONGS

CROSS REFERENCE TO RELATED APPLICATIONS

This application is a divisional application of U.S. patent application Ser. No. 13/837,264 filed Mar. 15, 2013, which claims priority from German Patent Application No. 10 2012 102 263.1 filed on Mar. 16, 2012 and German Patent Application No. 10 2012 104 733.2 filed May 31, 2012, which are hereby incorporated by reference.

FIELD OF INVENTION

The invention refers to a pair of tool tongs provided for the releasable holding of a tool, for example in a machine tool.

BACKGROUND OF THE INVENTION

Tool tongs of this kind are known. They are known either individually or in the form of tool changers in machining tools or machining lines. Here, machining tools of a machine tool supplied in a tool supply are transported into the machining spindle or removed from it. These processes are executed completely automatically, that is without manual interaction of a worker. It is known in the state of the art to form tool tongs of this kind from a basic element and a tongs clamping element. These two basic elements of the tool tongs are manufactured from cast material. The basic element is, for example, somewhat more massive than the tool clamping element. This is arranged, for example, moving or swiveling via an axis at the basic element, and preferably mounted on springs. It is possible here to open the tongs by pressing against the spring force. When the force is released, the tongs clamping element is pushed against the tool and its appropriate holding elements or clamping elements, and thus clamped. When the tool is clamped in the tongs, the tongs can be moved away from the spindle by suitable drives, and then, for example, be swiveled to a tool magazine. It is also possible to remove a tool from a tool magazine, and to transport it to the spindle of the machine tool. The tongs are opened again there when, for example, the tool is positioned in the magazine or in the spindle. Of course, also a tool changer supplying a multitude of machining tools for very different machining processes or operations can be provided instead of the tool magazine. Manufacturing the tool tongs is very complicated in the state of the art as these are cast elements. The casting molds have to be supplied accordingly, casting comes with high energy consumption, and it requires also a lot of time. Furthermore, subsequently, after casting, the tongs elements, that is basic element and tongs clamping element, have to be machined mechanically so that the corresponding holding and clamping elements are configured exactly correspondingly to the clamping elements of the tools. The large weight of the tool tongs resulting from the way of manufacturing is another disadvantage of the tool tongs of the state of the art.

In the specification DE 35 31 160 a pair of tool tongs designed as described before has become known. The tool tongs are here configured in two pieces, a tongs clamping element being arranged seesaw-like mounted on springs on a basic element.

Besides the already described disadvantages of the state of the art with a spring-mounted seesaw, of course, in embodiments of this type the problem arises that the spring can fatigue fast because of the permanent heavy load and break. Of course, this requires an earlier exchange of the entire tool tongs in the machine tool, resulting in corresponding expenses. The lifetime of these tool tongs are accordingly way too short. Even in the next solution of the state of the art, described farther above, a swiveling system is shown acting spring-loaded. The swiveling axis extends here parallel to the tool axis, and, when appropriate force is applied on the tool, the tool will be drawn out of the tool tongs in a movement orthogonal to the tool axis. In this case, the spring-mounted swiveling lever yields. A spring-mounted swiveling lever has, of course, the same disadvantages as the already before discussed embodiment, as a spring has the disadvantage that its spring force decreases when loaded permanently, and/or the spring becomes brittle and thus breaks easily. Of course, the discussed tool tongs are inserted in machine tools where tool changes have to be carried out rather frequently so that this spring is, of course, loaded considerably. Besides, the linear drive is, so to say, provided at the tongs basic element, and moves only one tongs part or one tongs half for opening and closing the tool tongs. The rest of the tool change process is carried out via a swiveling axis so that the tool, when moved in or out, still exerts a suitable force on the tool tongs half in order to maintain this swiveling movement. The result is a corresponding wear at the tool and the tongs. Furthermore, it cannot be guaranteed that the tool tongs can be operated altogether actively, that means that in the tool change position even another force has to act on the tool to move it out of the tongs. Additionally, the shifting operation of the linear motor is rather time-consuming so that it has been decided to provide another tongs part with an axis so that it can swivel elastically. In contrast to the solution according to the invention, here also the swiveling axis for the swiveling tongs part is arranged exactly in the direction of the longitudinal axis of the tool, what is a disadvantage altogether, as a larger force is required for effecting the opening and closing operation. The solution according to the invention completely removes these problems.

Additionally, it has to be stated that a spring as used in the state of the art shows basic disadvantages. It can slacken or break, and thus not execute correctly the holding function. As an additional component, a spring is very complicated to assemble. Furthermore, also break and wear can obstruct essentially the reliability of the tool tongs or the gripping or holding operation.

A tool changing device is known from the specification DE 20 2010 003 378. This tool changing device has at least one gripping device containing a first gripping element and a second gripping element that can move between a clamping position and a changing position for the releasable holding of a tool holder or a tool. A part of the movable second gripping element is designed as rotor of an electric linear drive.

A gripper for articles is known from the specification EP 355 271. Here, an elastic tongs element is provided in the carrier part, the elasticity being accomplished by appropriate recesses in the tongs material. When the tool moves in or out, here a certain inherent elasticity through the spring-like design of the tool tongs in the shape of the recesses in the tongs is used for bending up the tongs half and then to move back again by the inherent elasticity. The effect is here that only by the motion force of the tool, when it is pushed in the tool tongs, the tongs open or close, when the tool is positioned at the correct point. In truth, in this solution, also a high wear of the tool or the corresponding tool holder and the tool tongs has to be taken into account.

BRIEF SUMMARY OF THE INVENTION

Referring to this state of the art, it is an object of the invention to remove at least one of the disadvantages of the state of the art, such as, for example, laborious manufacture and high weight.

The problem of the invention is solved by tool tongs for the releasable holding of a tool that is provided in a machine tool, wherein the tool tongs are formed by a tongs basic element and a tongs clamping element interacting with and connected to the tongs basic element, wherein in the tool holding position the tongs basic element and the tongs clamping element hold the tool clampingly on gripping elements of the tool, wherein the tongs basic element and/or the tongs clamping element is/are made from an inherently elastic flat or plate-like material, such as, for example, steel sheet, wherein the tongs clamping element is put on the tongs basic element and is fastened there, and wherein an elastic deformation of the tongs clamping element is provided for releasing or clamping of the tool. This configuration according to the invention allows now forming the basic element and the tongs clamping element of flat material or plate-like material instead of the cast components used so far. Thus, in a single way both tongs elements can be manufactured. In contrast to the so far laborious casting procedures, what is required now is only severing or cutting the two elements out of the plate-like material, such as, for example steel sheet. This can be performed by simple and conventional machining processes. The effort for machining is reduced considerably. Furthermore, also the material used is also reduced considerably altogether, so that the weight of the tool tongs according to the invention is clearly lower. The manufacture can also be realized with, for example, CNC-controlled machines in a clearly shorter time than this has used to be the rule so far for the tongs elements, namely the tongs basic element and the tongs clamping element. Furthermore, even the pressure spring, required so far in the state of the art, is saved as the plate-like flat material shows a certain inherent elasticity, so that the spring is not necessary anymore either.

It is an advantage when the tool tongs according to the invention is characterized in that the tongs clamping element is made of inherent-elastic material, for example spring steel. The design of the tongs clamping element of spring steel makes, of course, the entire tool tongs altogether even essentially more flexible, and, in particular, the inherent spring force of the material leads to the effect that the additional spring at the tool tongs is not required anymore. The two tongs elements, that is tongs basic element and tongs clamping element, rest planely one upon the other. The tongs clamping element is fixed at least only on one spot or one point of the basic element, so that, because of the spring power, the tongs clamping element is easily resilient because of its inherent elasticity. Thus, when pressurized, the tongs can open at the end facing the tool, and, when released, close again. A complicated, seesaw-like axis connecting the two tongs elements is not necessary anymore either.

A development of the invention is characterized in that an elastic deformation of the tongs clamping element is provided for releasing and/or clamping the tool, wherein in particular by applying force on the tongs clamping element against the elasticity the end of the tongs clamping element facing the tool moves away from the tongs basic element, or, when this force is not active, moves towards it again.

Cleverly, the material thickness of the tongs clamping element is somewhat lower so that the elasticity of the material is sufficient that, when force is applied, only because of this elasticity, the end facing the tool is moved away from the basic element, and, when the force on the tongs clamping element is reduced or switched off, the inherent elasticity of the tongs clamping element or of the material is sufficient for clamping the tool. The tool tongs are positioned here, of course, corresponding with the gripping elements of the tool. When that has been done, for example, the force can be released so that the tongs clamp the tool because of the inherent elasticity.

The solution according to the invention removes disadvantages of the state of the art by designing a tongs basic element and a tongs clamping element formed of inherent-elastic flat material or plate-like inherent-elastic material that is put on the tongs basic element and fastened there, as an elastic deformation of the tongs clamping element for releasing and/or clamping the tool is provided. This elastic release, however, has to be influenced actively, that means by a force acting, for example, on the tongs clamping element, wherein an essential difference of the solution according to the invention to the state of the art is also the fact that the swiveling or folding axis extends orthogonally to the longitudinal axis of the tool, what is always identical in the state of the art. That means, in the state of the art always a folding or swiveling axis for the tool tongs extending parallel to the longitudinal axis of the tool is provided for effecting the opening or closing operation.

According to the invention, the inherent elasticity of the tool tongs elements is activated by additional means, that means either by an opening force acting, as described before, for example in operation position from below on the tongs clamping element, or a force engaging from above on the clamping element. The invention comprises both modifications, and distinguish, of course, the invention essentially from the solutions of the state of the art.

According to an advantageous development, that can, of course, be also combined in connection with the before described characteristics, tool tongs are provided where at the tongs clamping element one, preferably two, folding areas is/are provided in which the tongs clamping element deforms elastically when force or opening force is applied. The fact that the tongs clamping element is fixed on the tongs basic element has the result of the active, elastic deformation of the tongs clamping element when a force or opening force is applied. The basic element is designed here such that the force on the tongs clamping element acts in assembly position from above, or the opening force in assembly position acts from below on the tongs clamping element. It is clear here that at least one folding axis or folding edge is provided extending essentially orthogonally to the longitudinal axis of the tool, wherein then, of course, also the folding area(s) extend(s) orthogonally to the longitudinal axis of the tool. As already mentioned before, this offers considerable advantages compared with the solutions of the state of the art, and leads, in particular, to a form-fitting connection in a tool holding position, while the tool opening position can only be reached when the tongs clamping element is influenced actively, that means either the opening force or the force is applied.

It is provided according to the invention that the tool tongs shows a tool holding position and a tool change position. The tool change position can be set or accomplished here actively by applying or engaging the force and/or the opening force, wherein the tool holding position, that means in the condition when no force is applied, is reached automatically.

It is also an advantage here when at least one drive is provided for generating the force or opening force, wherein in particular preferred the tool in the tool holding position is located form-fitting in the tool tongs, and is held there in such a way that it cannot be released from the tool tongs. The force or opening force can here be provided in very different ways, for example through the movement of the tool tongs. Thus, they can be moved, for example, against a stopper in the machine tool in order to generate this force. Of course, this force can also be generated when the tool is inserted in the spindle, for example, by providing, for example, at the spindle head of the machine tool a suitable support or actuating element generating the opening force. Accordingly, in the simplest modification of the invention no additional drive for opening the tool tongs is required, but the functions of the machine tool can be used for generating this force. Of course, it is also possible, to provide additional means at the machine tool that can generate the force or opening force.

Accordingly, a development is also characterized in that for generating the force and/or opening force at least one actuator, in particular a hydraulic or pneumatic cylinder, an electro-mechanic drive, or a linear drive is provided, preferably a first actuator being provided at the hydraulic or pneumatic cylinder as drive for generating the force, and a second actuator being provided at the spindle or the spindle head of the machine tool in order to interact with a cam arranged at the tongs clamping element as drive for generating the opening force.

Accordingly, it has been clarified before that the described embodiments of the tool tongs according to the invention differ basically from the state of the art in that only by active influencing the tool tongs, the tool can be released from the tool tongs. The tool champing position can only be reached when the force acts actively on the tongs clamping element, so that the tongs open, while the tool holding position appears again when the force is not applied because of the inherent elasticity of the material of the tongs clamping element. The removal of the tool from the tool tongs is here without any wear, as a mechanic force component is not necessary anymore for this process.

The configuration of the invention is here such that the tongs clamping element withstands a high permanent load, as there are no one-segmented springs.

As the tongs clamping element is, of course, designed suitably compact compared with the state of the art, it has not the delicate structure of a spring, and is, accordingly, less prone to malfunctions. Another advantage according to the invention, already described several times, is that the tool does actually not move on its own—not even by impingement of a movement component of the tool—in the direction out of the tool tongs, but only by operating the tool tongs by means of the force or the opening force. These are big advantages according to the invention that lead, when used as intended, to tool standstill times because of premature wear of the tool tongs being reduced considerably. Furthermore, the tool tongs according to the invention can be manufactured rather simply because of the design according to the invention.

According to an advantageous development of the invention, the tool tongs are characterized in that the tongs basic element has a larger thickness of material, in particular three to four times, preferably four times as much as the tongs clamping element. The tongs basic element is accordingly configured a bit more solid than the tongs clamping element. Because the tongs basic element is cut off from, for example, steel sheet or steel and has the larger material thickness, the tongs basic element is sufficiently stable so that it does not deform when force is applied on the tongs clamping element. The tongs clamping element is fixed in such a way at the tongs basic element that, when used, it can move away from or towards the basic element at least on the side facing the tool. This makes it possible to create appropriate distances that are sufficient for safely gripping and clamping the tool at the gripping elements.

The tool tongs according to the invention are also characterized in that the tongs basic element and also the tongs clamping element can be manufactured by simple processing operations, such as for example cutting, welding and tearing, punching, laser machining or the like out of flat material or plate-like material. This means that the complicated and expensive operation of manufacturing casting moulds and also casting is saved. Furthermore, it is, of course, by this way of production possible to considerably reduce the used material compared with the tongs known in the state of the art. Thus the weight is reduced to almost half of the weight of a pair of tool tongs of the state of the art. Besides saving material and energy that comes with it when the tool tongs are used (it does require less force for moving than the tool tongs in the state of the art), of course, the basic element and the tongs clamping element can be manufactured, because of the more convenient way of production, in considerably shorter time than the cast components of the state of the art.

It is also an advantage when at the side facing the tool the tongs basic element has a semicircle or one third of circle shaping as tool holder interrupted by at least one, preferably two positioning segments. This tool holder corresponds, of course, with the gripping elements of the tool. It corresponds also, of course, with respect to the material thickness to a groove, for example arranged at the tool, in which the basic element engages, for example. For that, at least a part of the semicircle or one third of a circle-like shaping tapers wedge-like. This means the wedge-like design tapers facing the tool, when used. This improves, of course, the engagement of the tongs in the tool in the circumferential groove that is, as a rule, located at the tool as gripping groove. The wedge-like shaping causes, so to say, also an auto-centering of the basic element at the gripping element of the tool. The semi-circle or one third of circle shaping as tool holder has proven useful here, and is, of course, adapted to the shape of the tool corresponding to the gripping elements there.

Preferably, in the semicircle or one third of circle shaping at least one, however, preferred two positioning elements are located. They interrupt the semi-circle or one third of circle shaping. This makes it possible to position the tool exactly as it is required for a secure gripping and a safe transport from the tool magazine to the spindle or vice versa. Accordingly, the before described development of the invention is characterized in that the tool holder is configured, seen in section, wedge-like tapering outwards or tapering facing the tool in operation position, so that it can engage in a circumference groove of the tool in the tool holding position. The advantages of this embodiment have already been described.

According to the invention, it has been found to be an advantage when the tongs clamping element is supported at the tongs basic element at least on one attachment spot. By supporting the tongs clamping element at the tongs basic element on one or more attachment spots it becomes possible to use the resilient quality of the tongs clamping element. The attachment spot has here to be understood such that the tongs clamping element is fixed at this spot. The attachment spot or the attachment spots substitute the axis required in the state of the art. The other spots of the tongs clamping element, however, can move freely, and in particular the elasticity of the material of the tongs clamping element allows a tongs clamping function.

In order to accomplish and/or to improve this effect altogether, the tongs basic element has a U-shaped recess on the side opposite the tool. This creates two lateral webs on the outside, wherein at least on one of the webs one of the before mentioned attachment spots is provided. Thus, for example, the attachment spot can also be understood as tongs joint. When, for example, the tongs clamping element is pushed into the U between the two webs, the tongs clamping element moves away from the tongs basic element at the side facing the tool because of the fixing at the tongs joint or at the attachment spots of the webs. If the force is not applied or reduced, the tongs clamping element will move again towards the tongs basic element.

Accordingly, the invention is also characterized in that a tongs joint is formed by at least one attachment spot each on the webs of the tongs basic element. Of course, it is an advantage when the tongs clamping element in mounted condition is slotted, preferably exactly corresponding with the edges of the U-shaped recess of the tongs basic element, so that in the middle a flap forms arranged in the area of the U-shaped recess. This is, of course, a very clever configuration as thus the function of the tongs is improved altogether. Thus, for example, a force can act on the flap to lift the tongs clamping element from the tongs basic element at the end facing the tool.

The invention is also characterized by the option that a force acts on the flap, the force shifting the flap in the U-shaped recess. This deforms the tongs clamping element around a folding edge in a folding area elastically in such a way that the end of the tongs clamping element facing the tool moves away from the tongs basic element. This means the force acts on the flap and this is exactly opposite the direction of opening of the tongs clamping element. When the force is stopped again, the tongs clamping element moves exactly at this end again towards the tongs basic element. The application of a force, however, can be in exactly the opposite direction, namely in that at the tongs basic element between the tool holder and the attachment spot at least one penetration opening is provided that is covered on one side by the tongs clamping element, and thus an opening force can act on the tongs clamping element through the penetration opening, so that the tongs clamping element deforms around another folding edge or another folding area elastically such that the end of the tongs clamping element facing the tool moves away from the tongs basic element. Preferably, of course the active direction of this force as second force acts in opposite direction of the firstly described opening force. Thus, it is possible by the solution according to the invention in a simple manner to have forces acting out of different directions for opening the tool tongs on the tongs clamping element, namely, on the one hand, on the above-described flap, and, on the other hand, from the other side in opposite direction through the penetration opening on the tongs clamping element.

Furthermore, it is an advantage when the tongs clamping element has on the side facing the tool a C-shaped clamping depression the outer ends of which are designed hook-like. These hook-like ends engage in centering grooves of the tool in the tool holding position. Furthermore, it is an advantage when at the tongs clamping element at least one alignment edge is provided engaging, when used as intended, in an alignment corner provided at the tool.

The tool for the tool tongs according to the invention can be, for example, a metal-cutting tool, such as, for example, a drill, a milling cutter or the like. However, it can be just as well be designed as measuring or tactile tool. The invention is not restricted here to a certain type of tool. It rather is important that the tool tongs and the gripping elements of the tool are designed corresponding to each other to allow engaging.

The invention also refers to a tool changer for the inserting of a tool or removing a tool from a holder, for example, the tool holder of the working spindle of a machine tool, wherein the tool changer has at least one pair of tool tongs as described before, and a controlled drive is provided for positioning the pair of tool tongs at the working spindle or a tool magazine. As a rule, the tool changer serves in machine tools for positioning the respectively required tools at the spindle or for removing them there in order to take, for example, a freshly required tool for another machining process out of the tool magazine, and to transport it each time to the spindle or back, depending on the required function. Advantageously, a tool changer of this type has at least two of the before-described pairs of tool tongs so that the tool change can be carried out essentially more effective altogether. Accordingly, such a tool changer can be moved easier and thus with less energy because of the configuration with a pair of tool tongs according to the invention. Also the tool change can be accelerated by the tool changer according to the invention altogether, as the tongs, depending on the respective whereabouts, can be controlled from different directions. Thus it can be steered, for example, against a bolt that is provided, as it where, as limiting element. When the tongs with the tool changer approach this bolt, for example, the tongs clamping element is lifted from the tongs basic element so that the tool can either be removed or be inserted. In the same way it is possible to let a force act, for example, on the other end of the tongs to effect also the lifting of the tongs clamping element. Thus, the tool changer is not only lighter because of the design with the tool tongs according to the invention, but also altogether more efficient. Thus, for example, the positioning drive can also be employed at the same time for operating the tongs opening and closing operation. This reduction of tool changing time has an effect on the total employment of the machine tool. This means the actual machining times of the machine can be clearly prolonged.

The invention also refers to a tool magazine in which a multitude of tools can be supplied such that they can be taken out, wherein the tool magazine has at least two pairs of tool tongs as described before. The convenient way of manufacturing the tool tongs according to the invention allows now, of course, to cut out either a tool changer or a tool magazine from a carrier plate, wherein the carrier plate is shaped such that at least two tool tongs basic elements are created just during the manufacturing process of the carrier plate. Thus, for example, a square, rectangle, round or oval carrier plate can be used. At the outer edge of the carrier plate, then the shapings for the tongs basic element are carved out. The tongs clamping element is then created also analogously to the manufacturing of a single pair of tongs in the shape of a plate such that, when the clamping plate is put on the carrier plate, a multitude of tool tongs is created by the corresponding arrangement.

Accordingly, a development of the invention is characterized in that a tongs carrier, in particular a carrier plate or circulating chain or a circulating tape is provided carrying a multitude of single pairs of tool tongs, arranged each time independently from each other. A clever arrangement of the tool magazine or even the tool changer, as described before, can improve clearly also the manufacturing process for the tool changer and also the tool magazine altogether. Thus, here also considerable less material is required than, for example, for manufacturing tool magazines or tool changers in conventional design. Furthermore, clearly less material is needed, so that also the energy required for the movement of the magazines and/or the tool changers can be reduced altogether. As already mentioned, the weight share of a pair of tool tongs according to the invention is reduced by about 50% compared with the state of the art. In tool magazines and tool changers, respectively, with tool tongs according to the invention this share is one more time clearly reduced.

It is also advantageous when the tool magazine has a tongs basic element plate on which at least two tongs basic elements are arranged or provided in one piece, and the tool magazine has a tongs clamping element plate on which at least two tongs clamping elements are arranged or provided in one piece, and the tongs basic element plate and the tongs clamping element plate are arranged and connected to each other such that at least two tools result. Such a configuration of a tool magazine or a tool changer is very efficient and leads to material saving during manufacturing, but in particular also to energy saving during the operation of the tool changer and tool magazines.

A tool magazine as described before is characterized according to a development in that the tongs basic element plate and the tongs clamping element plate are designed with similar contours. This design with similar contours has already been described before, and has the result that, for example, a tool magazine can be manufactured from two plate-like elements with corresponding shapings. It is, in particular, an advantage when the tongs basic element plate and the tongs clamping element plate are designed ring- or disc-like, wherein the tongs basic element plate and the tongs clamping element plate have been manufactured from plate-like material. The material for the tongs basic element plate has here an even thickness of material, in the same way as the tongs clamping element plate. This is, as already described for the tool tongs according to the invention, of course material with a lower thickness, in order to be able to use the elastic moment of the tongs clamping element. Accordingly, the tongs basic element plate is formed, for example, of tool steel or steel sheet, while the tongs clamping element plate is formed of elastic material, such as, for example, spring steel. The tongs basic element and the tongs clamping element, respectively, of the tool magazine manufactured this way are also carved out by cutting, punching or metal-cutting machining. Thus it is clear that even the very complex operations for manufacturing a tool magazine with corresponding tool tongs are made considerably easier, and thus also the effort is considerably reduced.

According to the invention it has been found to be also an advantage when the tool magazine according to the invention has a tongs basic element plate carrying a multitude of in particular single tongs clamping elements. The tongs basic element is here, as described before, shaped accordingly so that a multitude of tongs basic elements, however, at least one tongs basic element, is formed in the tongs basic plate. Then at least one tongs clamping element is arranged individually on the shaped, that is contour-like, designed basic elements. This arrangement is executed preferably releasably fixedly. The advantage is here that, when used as intended, the individual tongs clamping element, that is loaded more, can be exchanged quicker when damaged or worn. This improves, of course, the lifetime of the entire tool magazine, as actually not always an entire tongs clamping element plate has to be exchanged, as in the before described embodiment, but here only a single tongs clamping element. Of course, on the tongs basic element a multitude of tongs basic elements can be shaped so that also a multitude of tongs clamping elements can be fixed there singly. Accordingly, depending on the different employment, also different wear will appear at the tongs clamping elements, so that it can be an advantage when they can be exchanged individually.

A development of the before described embodiment suggests that the tongs basic element plate is designed contour-like so that at least one, preferably a multitude of tongs basic elements is shaped, at least one, preferably a multitude of single tongs clamping elements is fastened to the tongs basic element plate congruently or correspondingly on the shaped tongs basic element, so that one or more pair(s) of tool tongs is/are formed. This is a preferred embodiment of the before generally described embodiment. It becomes clear here, that it is actually possible to configure a tool magazine with a multitude of tool tongs in such a way in the tool magazine that the single tongs clamping elements become universally exchangeable.

As already mentioned, the tongs clamping elements are here releasably fixedly, that means by appropriate fastening means, attached to the tongs basic element plate. One screw, bolt or the like each serve here as fastening means for a releasable, fixed definition of the attachment spots here. Of course, it is also possible, as described further above, that two screws on each side define each time an attachment spot. The invention is not restricted here to one of the described embodiments. Of course, also a bolt can be provided there carrying either a thread for holding a nut, or another clamping means that can be preferably of course be released.

As already mentioned, the invention accordingly suggests that the tongs clamping element(s) can be exchanged each time individually. The advantages of this configuration have already been described. It has to be mentioned that the embodiment described for the tool magazine, of course, also goes for the tool changer described further above. It is also possible here to shape an appropriate tongs basic element plate such that a multitude of tongs basic elements are formed in this tongs basic element plate on which a multitude of tongs clamping elements is arranged. Otherwise, the configuration of such a tool changer has to be understood as described further above.

BRIEF DESCRIPTION OF THE DRAWINGS

In the drawing the invention is shown schematically, in particular in an embodiment. In the figures.

DETAILED DESCRIPTION OF PREFERRED EMBODIMENTS

In the figures, identical or corresponding elements are indicated each time by the same reference numbers, and therefore are, if not different, not described anew.

Figure 1A:
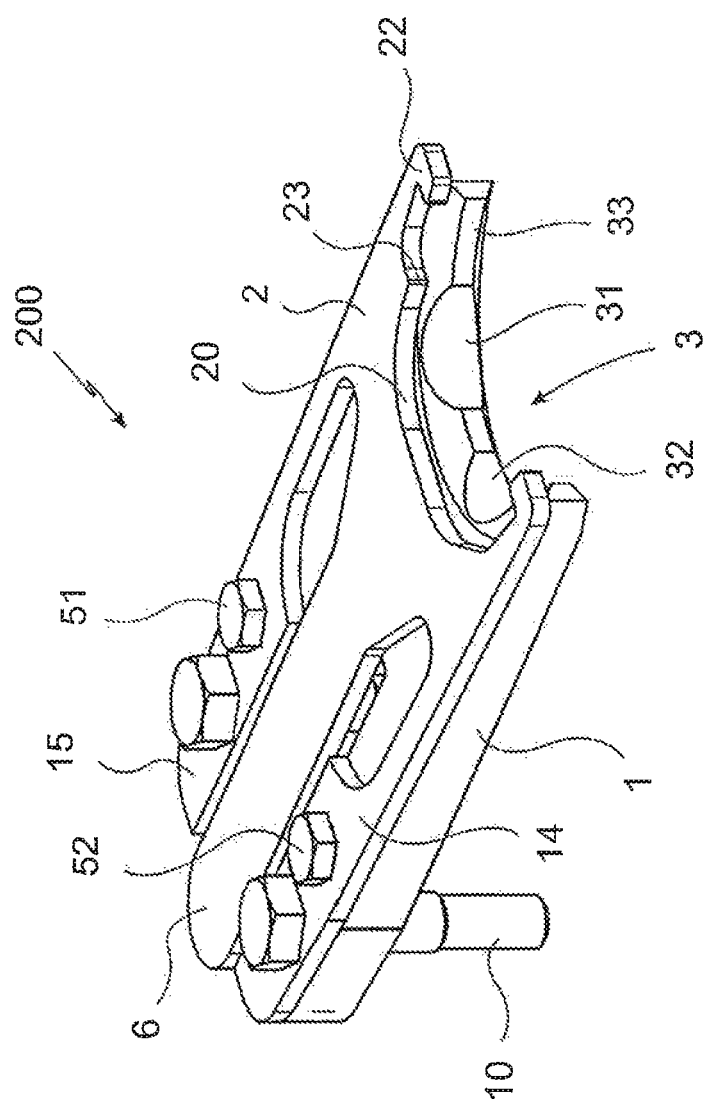
FIGS. 1a to 1c show several views of an embodiment of the tool tongs according to the invention.
Figure 1B:
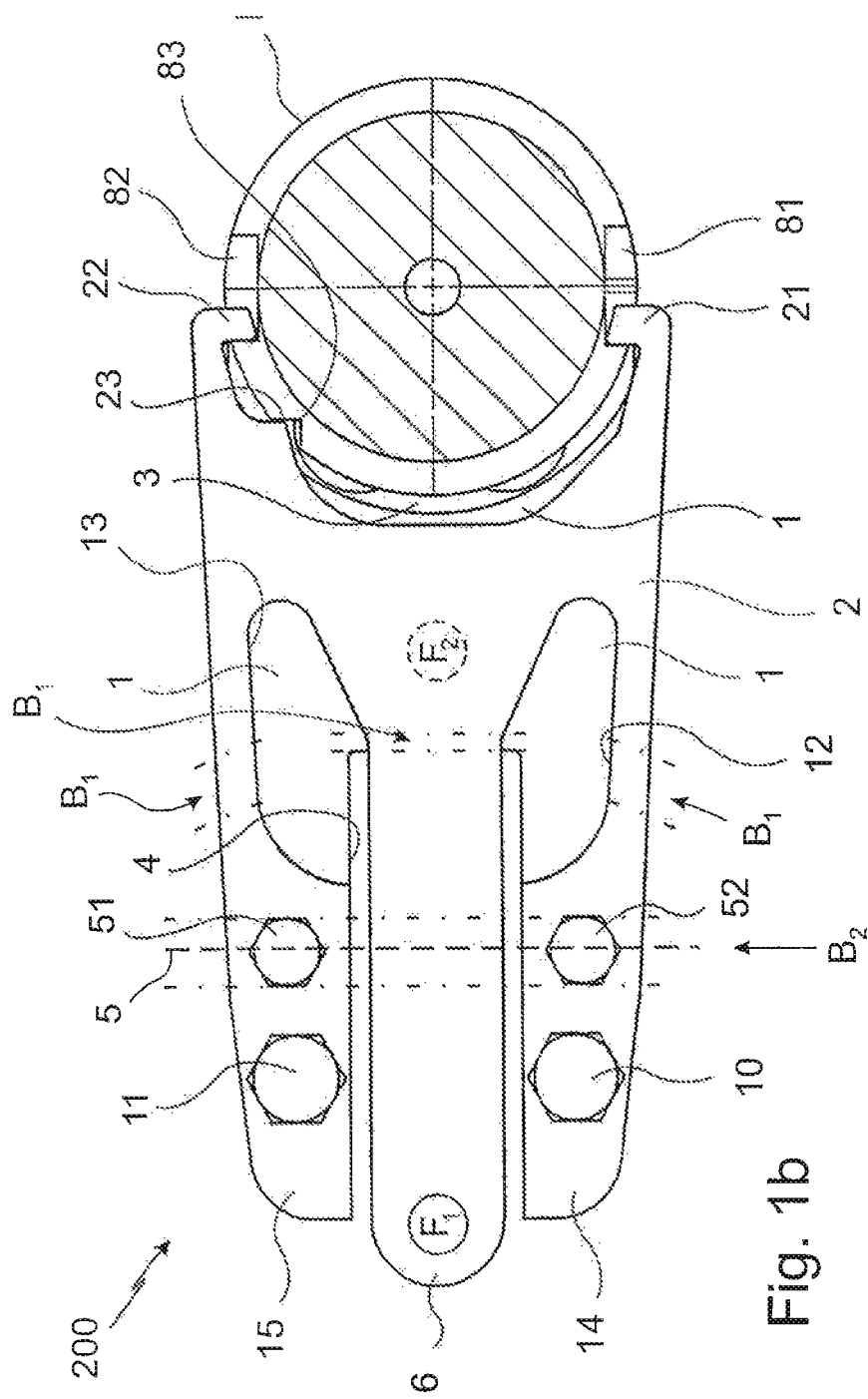
Figure 1C:
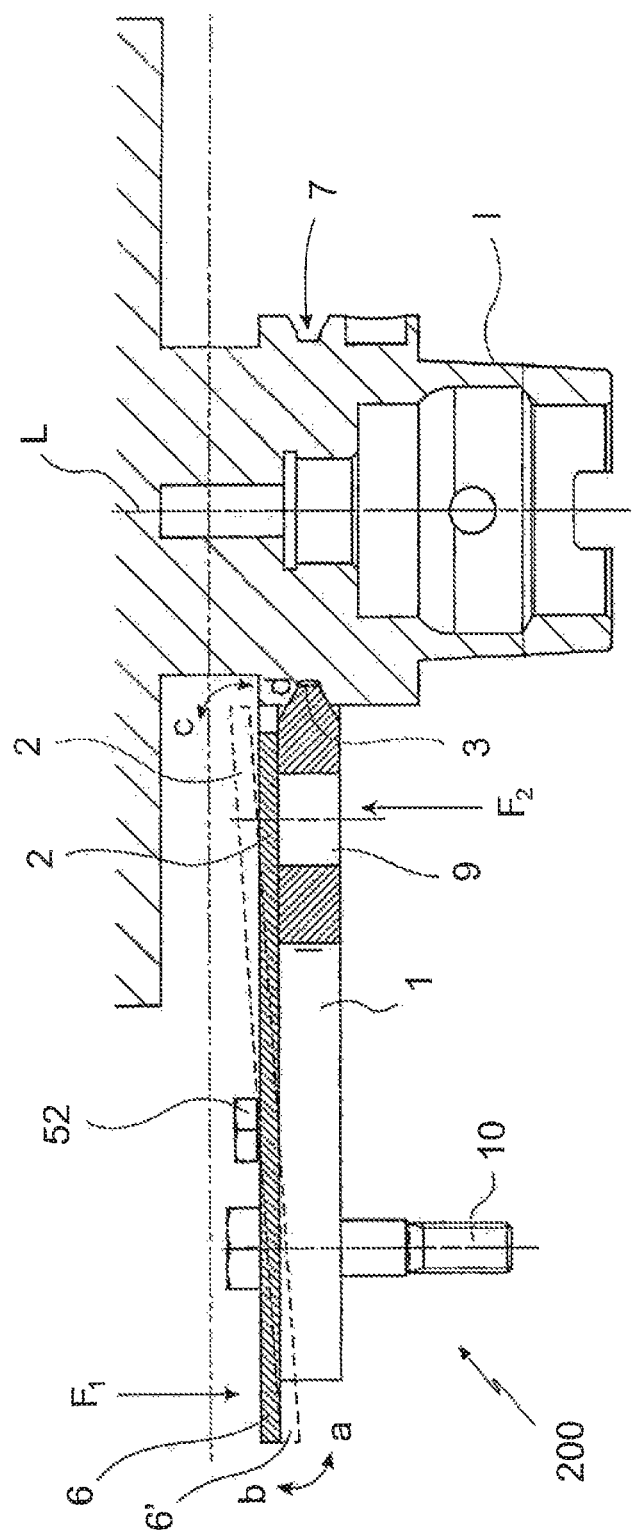

FIGS. 1a to 1c show different views of an embodiment of a tool tongs I according to the invention. As FIGS. 1a to 1c all refer to the same embodiment, they will also be described together in the following. FIG. 1a shows here a three-dimensional presentation of the tool tongs 200 according to the invention. As it can be seen, a tongs basic element 1 is provided on which a tongs clamping element 2 is fastened by, for example, the screws referred to as attachment spots 51, 52. By means of these screws 51, 52, the tongs clamping element 2, which is formed of inherent elastic material, is fixed at the tongs basic element 1. The tongs basic element 1 is, as it can be seen, provided with a U-shaped recess 4, so that on the outside two lateral webs 14, 15 are created on which the tongs clamping element 2 is put on and fixed in the shown embodiment. Above this U-shaped recess 4, a flap 6 of the tongs clamping element 2 is directly arranged. When now a force is applied on the flap 6, the end of the tongs clamping element 2 facing the tool I in direction of assembling is lifted from the tongs basic element. This means the inherent elasticity is sufficient for effecting this tongs clamping function. It is not necessary anymore here to provide a complicated axle, for example in the shape of a seesaw, at the tool tongs 200, the inherent elasticity is enough for effecting the elastic deformation via the attachment spots 51, 52 or at the edge of the U-shaped recess 4. The tongs basic element 1 has on the side facing in operation position the tool I a semi-circle or one third of circle shaping as tool holder 3. This tool holder 3 is interrupted by at least one—two in the shown embodiment—position segments 31, 32. Reference number 33 indicates the wedge-like spring that engages in a corresponding circumferential groove 7 of the tool when engaging in the tool. This circumferential groove 7 is shown in FIG. 1c. The tool holder 3 is, seen in section, facing outwards or, in operation position, the tool, and is thus shaped tapering wedge-like so that it is able to engage in a circumferential groove 7 of the tool I in the tool holding position. The tongs clamping element 2 is, as it can be seen, put directly on the tongs basic element 1, and fastened there by means of the attachment spots 51, 52. For fixing the tool tongs, for example, on a tool carrier or a tool magazine, the fastening means 10—here as screw—are shown. The tongs clamping element 2 has on the side facing the tool I a C-shaped clamping depression 20, the outer ends 21, 22 of which are designed hook-like in order to be able to engage in centering grooves 81, 82 of the tool I in the tool holding position. Furthermore, an alignment edge 23 is provided engaging in an alignment corner 83 provided at the tool, when used as intended.

FIG. 1b shows the embodiment already described in FIG. 1a in a top view. In addition to the already presented reference numbers and elements, respectively, of the tool tongs 200 according to the invention, it can be seen here that the tongs clamping element 2 is slotted correspondingly to the U-shaped recess 4 of the tongs basic element. On the side of the tongs clamping element 2 facing the tool I, expansions 12 and 13, respectively, are located increasing the elasticity of the tongs clamping element 2 altogether. The flap 6 of the tongs clamping element 2 is arranged exactly correspondingly to this U-shaped recess 4 of the tongs basic element. As it can be seen, approximately at the edge of the U-shaped recess 4 of the tongs basic element a folding area B1 is formed. This folding area B1 continues at the exterior areas of the tongs clamping element 2 in the form of the folding area B1 indicated here schematically. Thus, here an area is indicated acting for example on the flap 6 from above, when a force F1 is applied, so that the tongs clamping element 2 is deformed elastically in the mentioned area. Reference number 5 indicates a line running through the attachment spots 51, 52. This indicates another folding line indicated here as tongs joint 5. At this folding line also a second folding area B2 is created. This is indicated by dashed lines on both sides of the tongs joint 5. The tongs joint 5 acts, for example, when, as shown in FIG. 1c, a force F2 acts through a penetration opening 9 in the tongs basic element 1. Then the material will not be deformed on or in the folding area B1, as shown in FIG. 1b, but on the line or in the folding area B2 referred to as tongs joint 5. The other reference numbers, such as, for example, the outer corners 21, 22 of the tongs clamping element 2 engaging in centering grooves 81, 82 of the tool I can be seen better in this embodiment of FIG. 1b. In FIG. 1c, a sectional view of the side view, the forces F1 and F2, respectively, are indicated schematically by an arrow. If, for example, the force F1 acts on the tongs clamping element 2 or the flap 6 from above, this will move downward in direction a, so that the tongs clamping element is moved with the side facing the tool I in the position 2' in the direction of the double arrow c. 6' shows here the flap 6 in the position moved downward in direction a. If the force F1 is not applied anymore, the flap 6 moves again back in direction b in the usual position. If now the force F2 acts through the penetration opening 9 on the tongs clamping element 2, also the tongs clamping element 2 moves in direction c. This position is again indicated by 2'. Accordingly, it is clear that the tool tongs 200 according to the invention can be employed universally, thus, for example, force can be applied from two different directions. A circumferential groove 7 in which the semi-circle or one third of circle shaping engages as tool holder 3 is located at the tool I, that is shown here in a sectional view. This can be seen very clearly in FIG. 1c.

Figure 2:
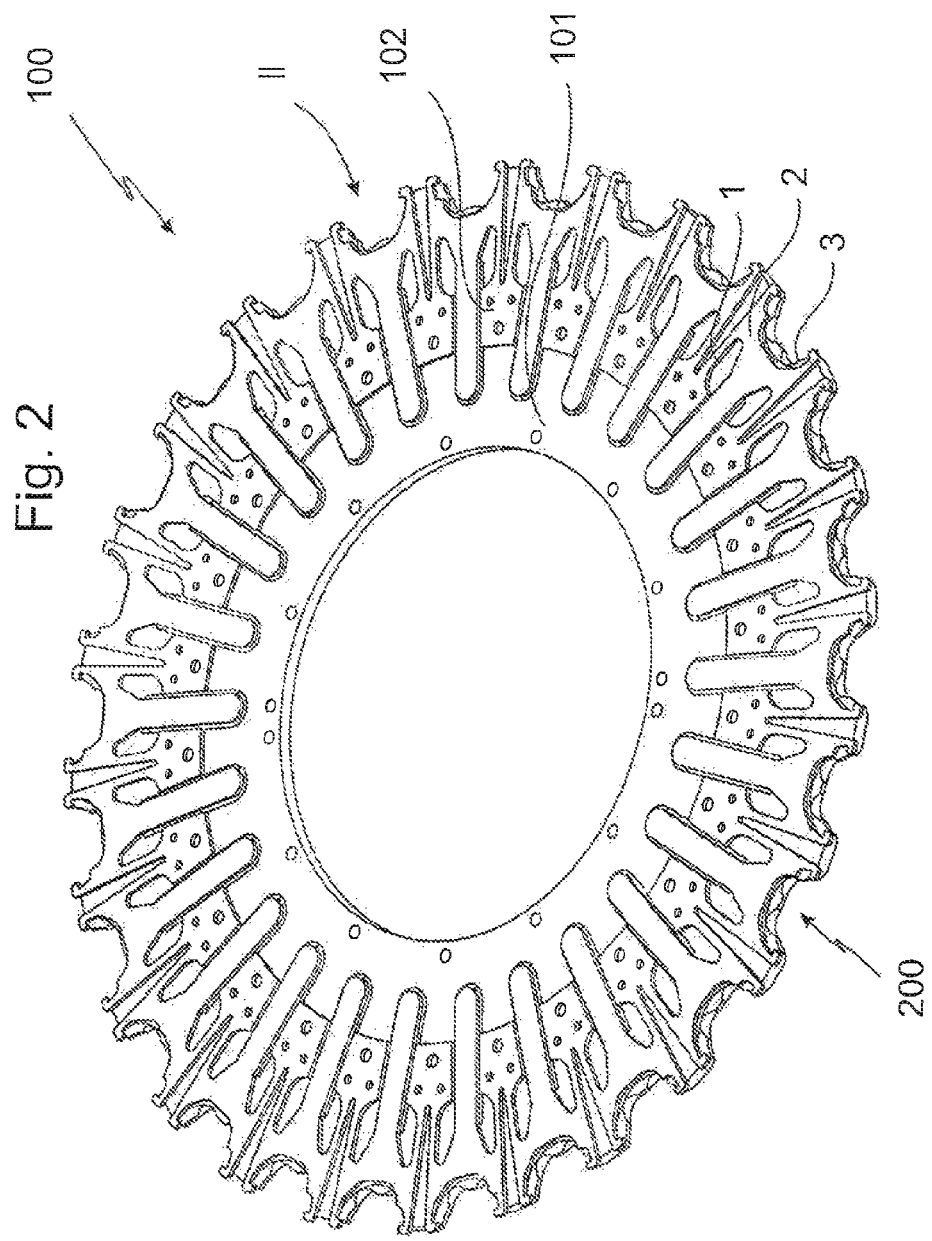
FIG. 2 shows a tool changer or a tool magazine according to the invention.

FIG. 2 shows a tool magazine 100 or a tool changer II. The embodiment presented in FIG. 2 is accordingly suitable as tool changer as well as tool magazine. The disc-like design of the tool magazine 100 chosen here is characterized in that the tool tongs 200 are created or formed, so to say, by shaping or cutting out of the necessary elements of the tongs clamping element 2 of a cover plate as tongs clamping element plate 102. The cover plate or tongs clamping element plate 102 is manufactured, for example, from elastic material, and arranged on the tongs basic elements of the tongs basic element plate 101, with these two plates being put one above the other congruently. As it can be seen, the tool tongs 200 have the same design as described in the preceding figures. Therefore presenting the already presented elements again is not necessary. In the tool tongs 200, for example, a multitude of tools can be supplied such that they can be taken out. The tool magazine 100 or the tool changer II consists here of a tongs basic element plate 101 and a tongs clamping element plate 102. They are arranged to one another and connected such that here a multitude of tool tongs 200 results.

A not shown embodiment for a tool magazine or a tool changer is designed such that the tongs basic element plate has, for the time being, a multitude of tongs basic elements that have been created by the shapings. Of course, it is sufficient to shape, for example, a single tongs basic element on the tongs basic element plate 101. On this tongs basic element 1 or on the tongs basic elements 1 altogether then a multitude of tongs clamping elements 2 is provided. Here, each tongs clamping element 2 is arranged on the tongs basic element plate correspondingly to the shaped tongs basic element 1. The advantage of such a design is the fact that here the higher loaded tongs clamping elements can exchanged individually. This increases further the entire universal function of the tool changer or the tool magazine.

Figure 3:
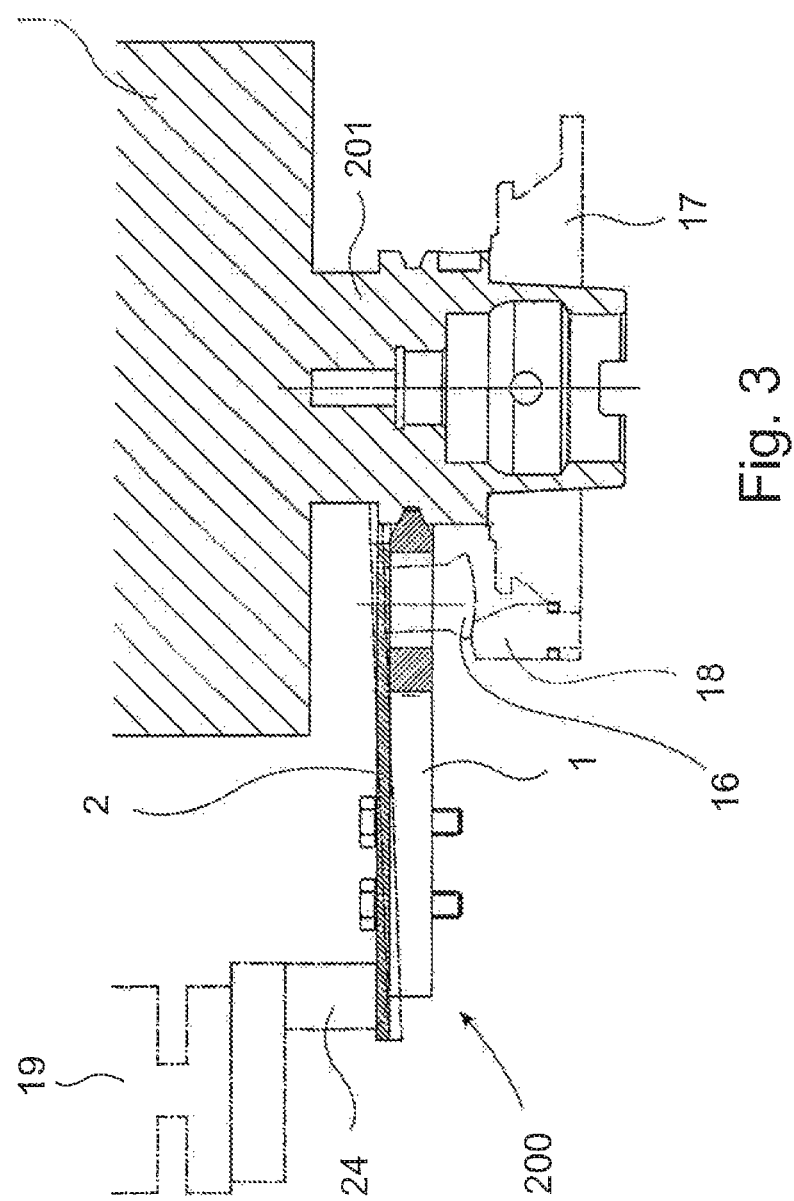
FIG. 3 shows a schematic presentation of the arrangement of a pair of tool tongs according to the invention at a spindle head of a machine tool.

FIG. 3 shows a schematic presentation of the arrangement of a tool tongs according to the invention at a spindle head of a machine tool in lateral view. In this figure too the reference numbers are used in the same way as already presented. Accordingly, the tool tongs 200 are indicated schematically. The tool tongs 200 consist of the tongs basic element 1 and the tongs clamping element 2. The tool I is fixed in the tool tongs 200 in the presentation. Here, at the tool a tool holder is provided as so-called hollow shank taper that has already been fixed at a spindle head 17. In this presentation, at the tongs clamping element a cam 16 is arranged for the first time interacting with a second actuator 18 arranged at the spindle head. That means, when the second actuator 18 is operated, the tongs clamping element 2 is lifted, as indicated with the dashed line, and thus the tool I can be released. However, this is only one modification of the invention or arrangement of the tool tongs 200 in a machine tool. For example, the second actuator 18 can act actively or even inactively. In the case of an inactive function, the motion and force component has to be performed by the adjustment movement of the tool tongs 200 itself or its not-shown drive. The motion component, however, can also be executed by the spindle head 17 or the second actuator arranged there. On the left hand side of the presentation in FIG. 3, a pneumatic cylinder 19 is indicated schematically. A first actuator 24 acting, when mounted, from above on the tongs clamping element is arranged at this pneumatic cylinder 19, so that also the end of the tongs clamping element 2 facing the tool I is lifted, as shown by the dashed line. The first actuator 24 is designed in the embodiment indicated only schematically, for example, as end of a pneumatic piston of the pneumatic cylinder 19. The pneumatic cylinder is provided here such that is acts actively on the tongs clamping element. However, here also a design is possible where a stopper or stopper element is arranged in the machine tool such that the intended adjustment movement of this tongs clamping element 2 is accomplished when the tongs clamping element 2 approaches the tool tongs. It is, of course, also provided according to the invention to employ instead of pneumatic cylinders, if necessary, electromechanic or electric adjustment elements, when this is an advantage for manufacturing the entire machine tool.

Although the invention has been described in terms of specific embodiments which are set forth in considerable detail, it should be understood that this is by way of illustration only and that the invention is not necessarily limited thereto, since alternative embodiments and operating techniques will become apparent to those skilled in that art in view of the disclosure. Accordingly, modifications are contemplated which can be made without departing from the spirit of the described invention.

While the present invention has been illustrated and described with respect to a particular embodiment thereof, it should be appreciated by those of ordinary skill in the art that various modifications to this invention may be made without departing from the spirit and scope of the invention.

What is claimed is:

1. Tool tongs provided for the releasable holding of a tool in a machine tool, said tool tongs comprising:
    a tongs basic element having a tool holder provided at a tool holder end thereof, said tool holder tapering towards the tool holder end or tapering towards the tool when said tool is being held by the tool tongs, so that the tool holder can engage in a circumferential groove of the tool when the tool tongs are in a tool holding position of the tool tongs and holding the tool, and wherein the tongs basic element further has an attachment end opposite the tool holder end, said attachment end comprising two lateral side webs defining a U-shaped recess, wherein at least one of the lateral side webs forms an attachment spot; and
    a tongs clamping element having a clamping end, wherein the tongs clamping element is supported on the tongs basic element at the at least one attachment spot,
    wherein, in the tool holding position of said tool tongs, the tool holder end of the tongs basic element and the clamping end of the tongs clamping element hold the tool, wherein at least the tongs clamping element is formed of inherently elastic flat material or plate-like inherently elastic material, wherein the tongs clamping element is removably fastened on the tongs basic element and wherein the tongs clamping element is configured for elastic deformation, relative to the tongs basic element, between the tool holding position and a tool changing position of the tool tongs with the clamping end of the tongs clamping element separated from the tool holder end of the tongs basic element for releasing and/or clamping the tool;
    wherein a tongs joint is formed on the tongs clamping element by the at least one attachment spot and the tongs clamping element further comprises a flap that is arranged within the opening of the U-shaped recess of the tongs basic element as defined by the two lateral side webs, such that a force shifting the flap into the U-shaped recess will cause the tongs clamping element to elastically deform in at least a first folding area to move the clamping end of the tongs clamping element away from the tongs basic element.

2. Tool tongs according to claim 1, wherein the tongs clamping element is formed of spring steel, and applying a force on the tongs clamping element against the elasticity of the tongs clamping element removes the clamping end of the tongs clamping element from the tool holder end of the tongs basic element.

3. Tool tongs according to claim 1, wherein the tongs clamping element is provided with at least one predetermined folding line at which the tongs clamping element deforms elastically when a force is applied to the tongs clamping element.

4. Tool tongs according to claim 1, wherein at least one folding line is provided extending essentially orthogonally to a longitudinal axis of the tool.

5. Tool tongs according to claim 1, wherein the tool tongs is in the tool holding position when no force is applied on the tongs clamping element, and wherein the tools tongs are moved to the tool changing position by applying or generating a force on the tongs clamping element, and wherein at least one drive is provided for applying or generating the force.

6. Tool tongs according to claim 5, wherein the tool being held by the tool tongs when said tool tongs are in the tool holding position is held securely in the tool tongs and thus cannot be released from the tool tongs.

7. Tool tongs according to claim 1, wherein the tongs basic element has a larger thickness of material than the tongs clamping element.

8. Tool tongs according to claim 1, wherein the tongs basic element comprises at least one penetration opening between the tool holder end and the opposite attachment end, said at least one penetration opening being covered on one side by the tongs clamping element, such that, by protrusion of an actuator through the at least one penetration opening, the tongs clamping element deforms elastically to move its clamping end away from the tongs basic element.

9. Tool tongs according to claim 1, wherein the tongs clamping element has a C-shaped clamping depression defining terminal lateral ends and at least one alignment edge on the clamping end thereof, wherein the terminal lateral ends of the depression are hook-like for engaging in centering grooves of the tool when the tool tongs are in the tool holding position and holding the tool, and the at least one alignment edge is provided for engaging in an alignment corner of the tool when the tools tongs are in the tool holding position and holding the tool.

10. Tool tongs according to claim 1, wherein the tongs basic element has a thickness of material three to five times larger than a thickness of material of the tongs clamping element.

11. Tool tongs according to claim 1, wherein the tongs basic element has a thickness of material four times larger than a thickness of material of the tongs clamping element.

12. Tool tongs according to claim 1, wherein the tongs basic element has an arcuate tool holder surface on the tool holder end that is interrupted by at least one position segment.

\* \* \* \* \*